United States Patent
Tabata

(10) Patent No.: US 10,821,868 B2
(45) Date of Patent: Nov. 3, 2020

(54) VEHICLE SEAT AND METHOD OF MANUFACTURING HEADREST

(71) Applicant: TACHI-S CO., LTD., Akishima (JP)

(72) Inventor: Tsuyoshi Tabata, Akishima (JP)

(73) Assignee: TACHI-S CO., LTD., Tokyo (JP)

( * ) Notice: Subject to any disclaimer, the term of this patent is extended or adjusted under 35 U.S.C. 154(b) by 82 days.

(21) Appl. No.: 16/199,410

(22) Filed: Nov. 26, 2018

(65) Prior Publication Data
US 2019/0217762 A1    Jul. 18, 2019

(30) Foreign Application Priority Data

Jan. 15, 2018 (JP) ................................ 2018-004037
Jan. 15, 2018 (JP) ................................ 2018-004038

(51) Int. Cl.
| | | |
|---|---|---|
| *B60N 2/80* | (2018.01) | |
| *B60N 2/809* | (2018.01) | |
| *B60N 2/882* | (2018.01) | |
| *B60N 2/879* | (2018.01) | |
| *B29C 44/18* | (2006.01) | |
| *B29C 44/12* | (2006.01) | |

(Continued)

(52) U.S. Cl.
CPC .......... *B60N 2/809* (2018.02); *B29C 44/1228* (2013.01); *B29C 44/1271* (2013.01); *B29C 44/18* (2013.01); *B60N 2/7017* (2013.01); *B60N 2/80* (2018.02); *B60N 2/879* (2018.02); *B60N 2/882* (2018.02); *B29C 44/353* (2013.01); *B29L 2031/3023* (2013.01); *B60N 2002/899* (2018.02)

(58) Field of Classification Search
CPC ........ B60N 2/809; B60N 2/882; B60N 2/879; B60N 2/80; B60N 2/7017; B60N 2/888; B60N 2/2851; B60N 2/885; B60N 2002/899; B29C 44/1228; B29C 44/1271; B29C 44/18; B29C 44/353; B29C 44/182; B68G 7/05; B68G 7/06; B29L 2031/3023
USPC ..................................................... 297/391
See application file for complete search history.

(56) References Cited

U.S. PATENT DOCUMENTS

| | | | | |
|---|---|---|---|---|
| 4,925,508 A | * | 5/1990 | Goto ................... | B29C 44/1271 156/79 |
| 5,061,419 A | * | 10/1991 | Kouda .................... | B29C 33/48 249/184 |

(Continued)

FOREIGN PATENT DOCUMENTS

| | | | |
|---|---|---|---|
| JP | 11207060 | * | 8/1999 |
| JP | 2003236855 | * | 8/2003 |

(Continued)

*Primary Examiner* — Mark R Wendell
(74) *Attorney, Agent, or Firm* — SGPatents PLLC

(57) ABSTRACT

A vehicle seat includes a headrest, a seat back to which the headrest is attached, and a seat cushion connected to the seat back. The headrest includes pillar frames attached to the seat back, a core member that includes a pouring passage penetrating from one end to the other end, a cover that covers the core member and a part of the pillar frames, and a cushion member that is formed in a gap between the outer surface of the core member and the inner surface of the cover and inside the pouring passage. The pouring passage extends in a first direction from the one end of the core member to reach a predetermined position, extends in a second direction from the predetermined position to reach the other end, and includes a bent part at the predetermined position.

15 Claims, 14 Drawing Sheets

(51) Int. Cl.
   *B60N 2/70* (2006.01)
   *B29C 44/34* (2006.01)
   *B29L 31/30* (2006.01)

(56) References Cited

U.S. PATENT DOCUMENTS

| | | | |
|---|---|---|---|
| 9,707,871 B2 * | 7/2017 | Okamoto | B60N 2/80 |
| 9,950,654 B1 * | 4/2018 | Contreras | B60N 2/80 |
| 2010/0038952 A1 * | 2/2010 | Tsuji | B60N 2/5891 |
| | | | 297/452.48 |
| 2013/0302584 A1 * | 11/2013 | LaFlamme | B32B 5/18 |
| | | | 428/218 |
| 2015/0159721 A1 * | 6/2015 | Okubo | F16F 7/108 |
| | | | 297/404 |
| 2018/0029876 A1 | 2/2018 | Fujita et al. | |

FOREIGN PATENT DOCUMENTS

| | | | |
|---|---|---|---|
| JP | 2008228827 | * | 10/2008 |
| JP | 2011131774 | * | 7/2011 |
| WO | WO 2016/117687 A1 | | 7/2016 |

\* cited by examiner

VEHICLE SEAT AND METHOD OF MANUFACTURING HEADREST

CLAIM OF PRIORITY

The present application claims priority from Japanese Patent Application JP2018-004037 filed on Jan. 15, 2018 and Japanese Patent Application JP2018-004038 filed on Jan. 15, 2018, the contents of which are hereby incorporated by reference into this application.

BACKGROUND

This disclosure relates to a vehicle seat, and can be applied for example to a vehicle seat including a headrest that is foam-molded integrally with a surface skin.

In recent years, a headrest has been required in which a mechanism for reducing the thickness of the pad layer for weight reduction (shock absorb member), a mechanism for adjusting the front-rear position of the headrest (position adjusting mechanism), a mechanism for providing the sound such as a speaker (audio mechanism), and the like for example are inserted inside the surface skin member. In such case, when the pad layer is to be foamed integrally with a surface skin member, there is a problem that these mechanisms prevents the foaming action of the polyurethane foaming raw material, even foaming cannot be effected, and underfill is liable to occur by a gas pool and the like (WO 2016/117687).

Therefore, in WO 2016/117687, a pouring passage forming member having a foaming raw material pouring passage that is formed to be straight so as to be generally along the vertical direction of the headrest in an attitude of the time of being attached to the seat is set inside the surface skin member, and the foaming raw material that forms the pad layer is poured through the foaming raw material pouring passage. To be more specific, a foamed molded product that is the pouring passage forming member is formed into a generally rectangular parallelepiped shape having a width to be accommodated between the left and right side support members, and the foaming raw material pouring passage penetrating in the vertical direction is formed at the generally center part in the width direction. The foaming raw material poured from the pouring nozzle passes through the foaming raw material pouring passage, flows in to the top part side of the headrest, and is diffused so as to flow through the gap between the outer surface of the foamed molded product and the inner surface of the surface skin member from the top part side to the lower side.

SUMMARY

However, according to WO 2016/117687, when the gap between the outer surface of the foamed molded product and the inner surface of the surface skin member is narrow, unless there is a measure for enlarging the gap by a swinging head supporting plate and the like, it takes time for the foaming raw material to reach the lower side, and filling of polyurethane (cushion member) in the lower side becomes insufficient.

Also, when the foaming raw material pouring passage is formed to be straight in the vertical direction as WO 2016/117687, if the position of the upper end of the foaming raw material pouring passage and the position of the top part of the headrest are shifted from each other, there is a case where it takes time for the foaming raw material to reach the side opposite to the top part with respect to the upper end of the foaming raw material pouring passage and filling of polyurethane becomes insufficient.

The object of the present disclosure is to provide a vehicle seat including a headrest in which filling of the cushion member by foam-molding integrally with a surface skin is more even.

Other problems and new features will be clarified from descriptions of the present description and the attached drawings.

Followings are brief explanation of the summary of the representative ones out of the present disclosure.

(1) A vehicle seat includes a headrest, a seat back to which the headrest is attached, and a seat cushion that is connected to the seat back. The headrest includes pillar frames that are attached to the seat back, a core member that includes a pouring passage penetrating from one end to the other end, a cover that covers the core member and a part of the pillar frames, and a cushion member that is formed in the gap between the outer surface of the core member and the inner surface of the cover and inside the pouring passage. The pouring passage extends from the one end of the core member in a first direction to reach a predetermined position, extends from the predetermined position in a second direction to reach the other end, and has a bent part at the predetermined position.

(2) A vehicle seat includes a headrest, a seat back to which the headrest is attached, and a seat cushion that is connected to the seat back. The headrest includes pillar frames that are attached to the seat back, a core member that includes pouring passage penetrating from one end to the other end, a cover that covers a part of the pillar frames and the core member, and a cushion member that is formed in the gap between the outer surface of the core member and the inner surface of the cover. The pouring passage extending from the inner side of the core member to the other end is located at a position where a foaming raw material is diffused evenly in the front-rear direction.

According to the vehicle seat described above, filling of the cushion member can be effected more evenly.

DESCRIPTION OF THE PREFERRED EMBODIMENTS

Below, embodiments, comparative examples, and modification examples will be explained using the drawings. However, in the explanation below, same configuration elements are marked with a same reference sign, and repeated explanation may possibly be omitted. Further, although there is a case where the drawings are expressed schematically with respect to the width, thickness, shape, and the like of each part compared to the actual aspect in order to make the explanation clearer, the case is only an example, and does not limit interpretation of the present invention. Also, in the explanation below, based on a case where a vehicle mounting the vehicle seat is placed on the horizontal plane, the vertical direction is defined as the up-down direction (UP, DW). Also, the front-rear direction (FR, RR) is defined so as to agree with the longitudinal direction of the vehicle, and the left-right direction (width direction) is defined so as to agree with the width direction of the vehicle. FR is the vehicle forward direction, and RR is the vehicle rearward direction. Also, a vehicle seat 1 will be explained referring to the right side (RH) and the left side (LH) as viewed from the rear of the vehicle.

First Embodiment (Vehicle Seat)

Figure 1:
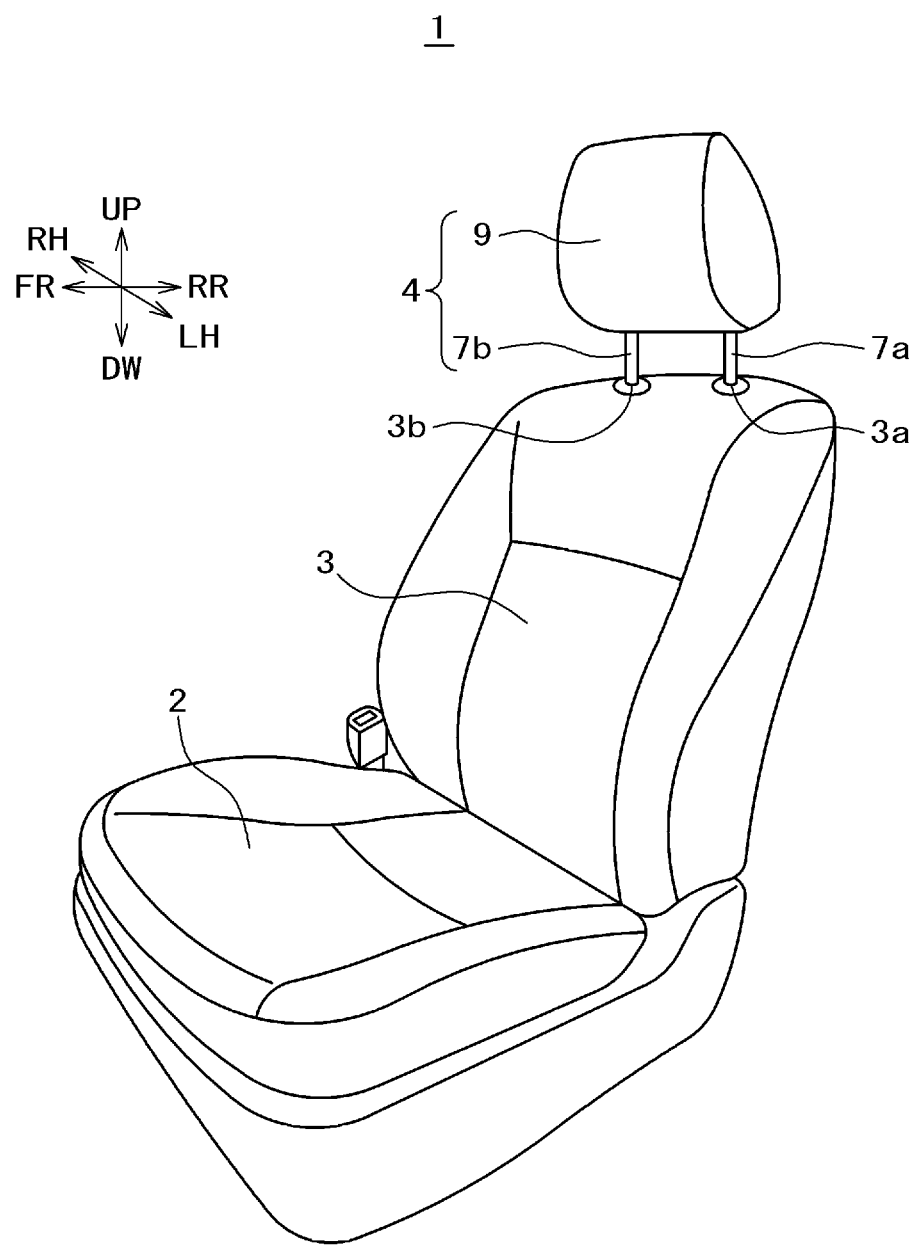
FIG. 1 is a perspective view that shows a vehicle seat related to the first embodiment.

The vehicle seat related to the first embodiment will be explained using FIG. 1. FIG. 1 is a perspective view that shows the vehicle seat related to the first embodiment. The vehicle seat 1 shown here is, for example, one of plural seats installed inside an automobile that is one kind of vehicles.

The vehicle seat 1 includes a seat cushion 2 that is a portion where an occupant sits on, a seat back 3 that is erected at the rear end of the seat cushion 2, and a headrest 4 that is attached to the upper end part of the seat back 3.

The seat cushion 2 is attached to the floor of the vehicle, and can include a mechanism that allows adjusting the position in the front-rear direction or allows adjusting the height.

The seat back 3 is a portion configuring a backrest, and is connected to the seat cushion 2 in a state turnable around a turning shaft (not illustrated) arranged at the lower end part. That is to say, the vehicle seat 1 is provided with a reclining function of tilting the seat back 3 rearward and a forward tilting function of tilting the seat back 3 forward, and the seat back 3 is configured to be turnable with respect to the seat cushion 2.

The headrest 4 is attached to the seat back 3 in a state the height position is adjustable.

The seat cushion 2, the seat back 3, and the headrest 4 are configured that a frame that becomes a framework member and a cushion member formed of a foamed resin and the like are arranged in the inside and the surface of the cushion member is covered with a cover 9.

(Headrest)

Figure 2:
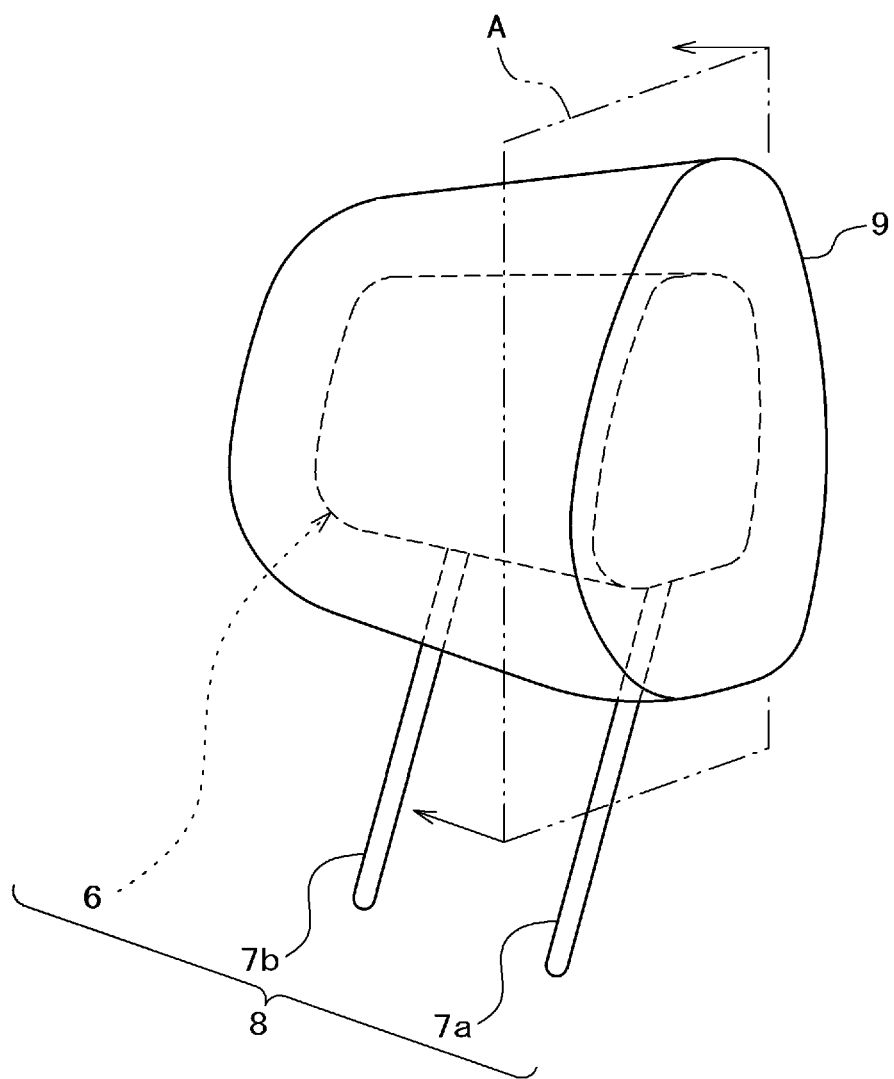
FIG. 2 is an enlarged perspective view of a headrest of FIG. 1.
Figure 3:
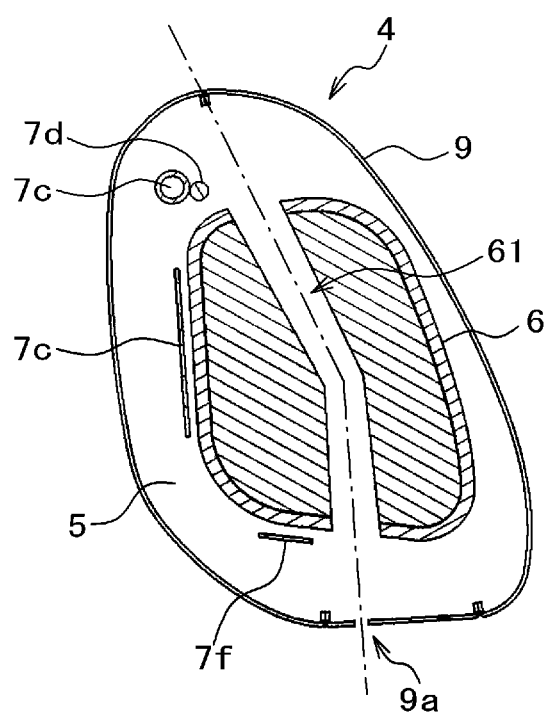
FIG. 3 is a vertical cross-sectional view along the section A in FIG. 2.

The headrest will be explained using FIGS. 2, 3. FIG. 2 is an enlarged perspective view of the headrest of FIG. 1. FIG. 3 is a vertical cross-sectional view along the section A in FIG. 2.

The headrest 4 includes a headrest frame 8, the cover 9, and a cushion member 5. The headrest frame 8 includes a core member 6, pillar frames 7a, 7b, a frame 7c that connects the pillar frames 7a, 7b to each other, a support wire 7d that fixes the core member 6, and brackets 7e, 7f that fix the core member 6. The pillar frames 7a, 7b and the frame 7c are formed by bending one piece of metal-made pipe for example, and a left and right pair of the vertical frame parts extending in the generally perpendicular direction are the pillar frames 7a, 7b. The support wire 7d is formed by bending a metal-made wire for example, and is fixed to the frame 7c. The brackets 7e, 7f are fixed to the frame 7c.

The core member 6 is formed by joining the front core member and the rear core member, or the right core member and the left core member, or the upper core member and the lower core member. The core member 6 is formed of a hard resin for example PP (polypropylene), or an ABS resin. Also, the core member 6 is a case body of such mechanism as described in Background for example, and corresponds to a speaker box in the example of an audio mechanism.

A pouring passage 61 is formed which is a hole penetrating in the vertical direction in the vicinity of the center in the left-right direction of the core member 6. The pouring passage 61 extends upward (first direction) from the lower end of the core member 6, is bent to the front side in the vicinity of the center (predetermined position), and extends to the upper end of the core member 6 (second direction). The cross section of the pouring passage 61 perpendicular to the extending direction has a circular shape. The angle formed by the first direction and the second direction is larger than 0 degree and less than 90 degrees.

The cover 9 is formed into a bag shape by sewing the surface skin members together. An opening is formed in the bottom part of the cover 9. The core member 6 is covered with the cover 9 by inserting the core member 6 of the headrest frame 8 from the opening of the bottom part of the cover 9 to the inside of the cover 9 and blocking the opening. Also, at the bottom part of a state the opening of the bottom part of the cover 9 is blocked, a pouring hole 9a is arranged, a pouring nozzle 22 described below being inserted to the pouring hole 9a. The lower end of the pouring passage 61 is positioned in the first direction from the pouring hole 9a. Also, the cushion member 5 is formed between the core member 6 and the cover 9 by a method described below. As the cushion member 5, polyurethane foam for example is used. The pillar frames 7a, 7b extend to outside the cover 9. As shown in FIG. 1, by inserting the pillar frames 7a, 7b to holes (headrest guides) 3a, 3b arranged at the top part of the seat back 3, the headrest 4 is attached to the seat back 3.

Figure 4:
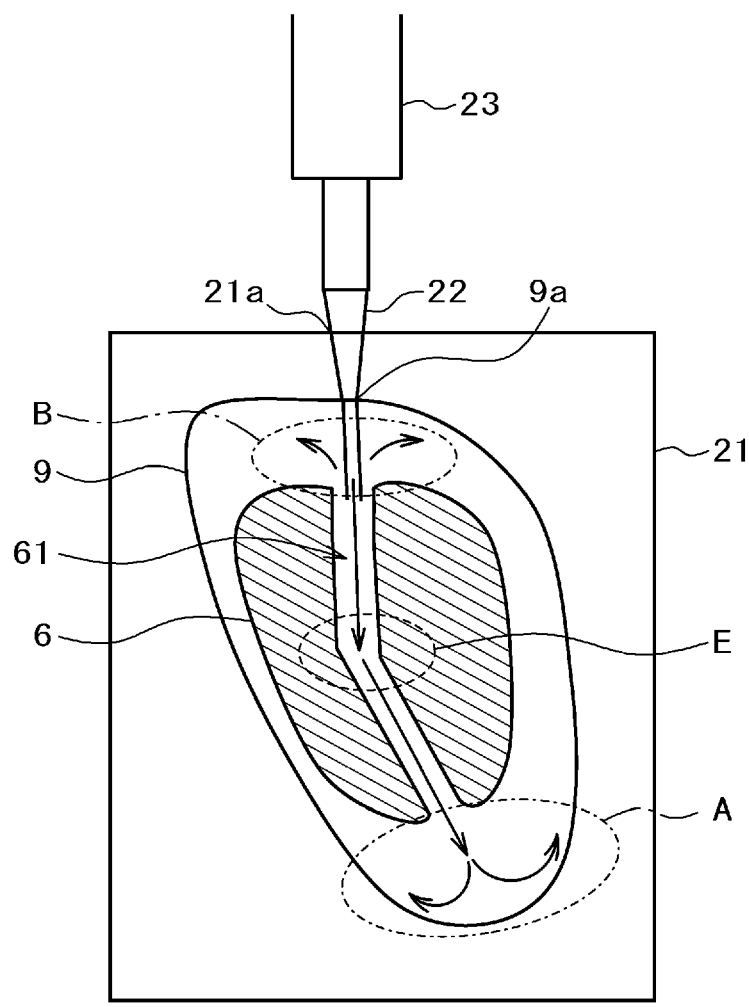
FIG. 4 is a schematic cross-sectional view that shows a state a headrest frame and a cover are arranged in a mold.

Next, a method of manufacturing the headrest 4 (foam-molding integrally with surface skin) of the present embodiment will be explained using FIG. 4. FIG. 4 is a schematic cross-sectional view that shows a state a headrest frame and a cover are arranged in a mold.

First, the headrest frame 8 including the core member 6 is inserted to inside the cover 9 formed into a bag shape through the opening formed at the bottom part of the cover 9. Thereafter, by blocking the opening of the bottom part of the cover 9, the core member 6 is entirely covered with the cover 6 with the exception of the pouring hole 9a. In this state, the pillar frames 7a, 7b extend outside the cover 9 through 2 holes that are not illustrated. Then, the pouring nozzle 22 is inserted to the inside of the cover 9 from the pouring hole 9a so that the distal end portion of the pouring nozzle 22 enters inside the cover 9. Next, the cover 9 is set inside a mold 21, and the headrest frame 8 including the core member 6 is set to a predetermined position inside the cover 9. When the headrest frame 8 including the core member 6 is set inside the mold 21, the pillar frames 7a, 7b of the headrest frame 8 are set to a predetermined position so that the end parts that become the lower end in being attached to the seat back 3 project outward via through holes (not illustrated) formed in the mold 21. By setting the pillar frames 7a, 7b to the predetermined position, positioning of the headrest frame 8 including the core member 6 in the inside of mold is effected. Also, in a similar manner, the pouring nozzle 22 positioned between the positions where the pillar frames 7a, 7b project is also set to a predetermined position inside the mold, and positioning is effected. By the positioning of the pillar frames 7a, 7b inside the mold and positioning of the pouring nozzle 22 inside the mold, disposal of the pouring nozzle 22 with respect to the pouring passage 61 of the core member 6 is effected, and a gap at the time of the reverse flow described below is secured. Thereafter, foaming raw material (polyurethane foaming raw material for example) is poured from a pouring machine 23 into the mold through the pouring nozzle 22. At this time, the pouring machine 23 above the mold 21 is disposed so that a pouring hole 21a of the mold 21 comes to the upper part. Therefore, the top and bottom of the core member 6 and the cover 9 of FIG. 4 become opposite to FIG. 3.

In concrete terms, the pouring passage 61 is formed in the core member 6, the pouring nozzle 22 is inserted into this pouring passage 61, and the foaming raw material is poured from the pouring machine 23 with a predetermined pressure. Because the foaming raw material hits the bent part (part E) of the pouring passage 61, stirring of the foaming raw material poured from the pouring nozzle 22 is promoted, and the foaming raw material blocks the pouring passage 61. Thereby, a part of the foaming raw material passes through the pouring passage 61, flows in directly to the top part side (part A) of the headrest 4, a part of the foaming raw material can be left in the lower side (part B) of the headrest 4, and therefore the forming raw material diffuses so as to flow to the gap between the outer surface of the core member 6 and the inner surface of the cover 9 from both of the part A and the part B. Thereby, because the foaming raw material reaches all gaps until foaming starts and is foamed, the core member 6 is filled with the cushion member 5. Also, the cushion member 5 is formed in the gap between the outer surface of the core member 6 and the inner surface of the cover 9, but is formed also inside the pouring passage 61.

The bore of the pouring passage 61 is larger than the outside diameter of a portion of the pouring nozzle 22 inserted to the pouring passage 61 so that the foaming raw material poured can flow reversely, and there is a gap between the pouring nozzle 22 and the pouring passage 61. It is preferable to set the inside diameter of the pouring passage 61 to 2.5 to 5 times of the outside diameter of the pouring nozzle 22. Also, it is preferable that the bore of the pouring passage 61 is 20 mm or less. For example, when the discharge amount per second of the foaming raw material is 170 [g/sec], urethane density is 0.050 [g/cm³], and the reaction rate (rise time) is approximately 10 [sec], the bore of the pouring passage 61 only has to be 20 mm or less. In order to increase the flow speed (to fill quickly), the bore of the pouring passage 61 is preferable to be as narrow as possible.

Figure 5:
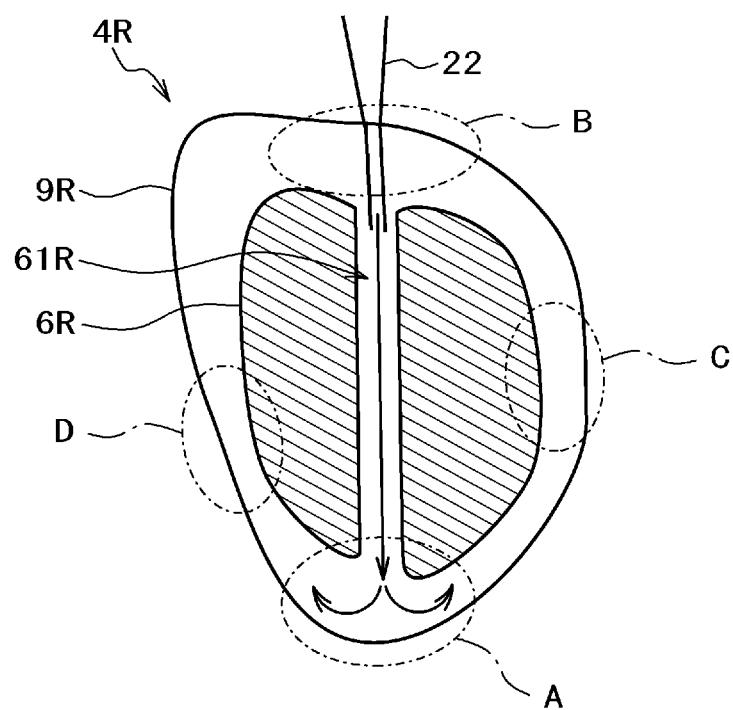
FIG. 5 is a schematic cross-sectional view that shows a headrest of the comparative example 1-1.
Figure 6:
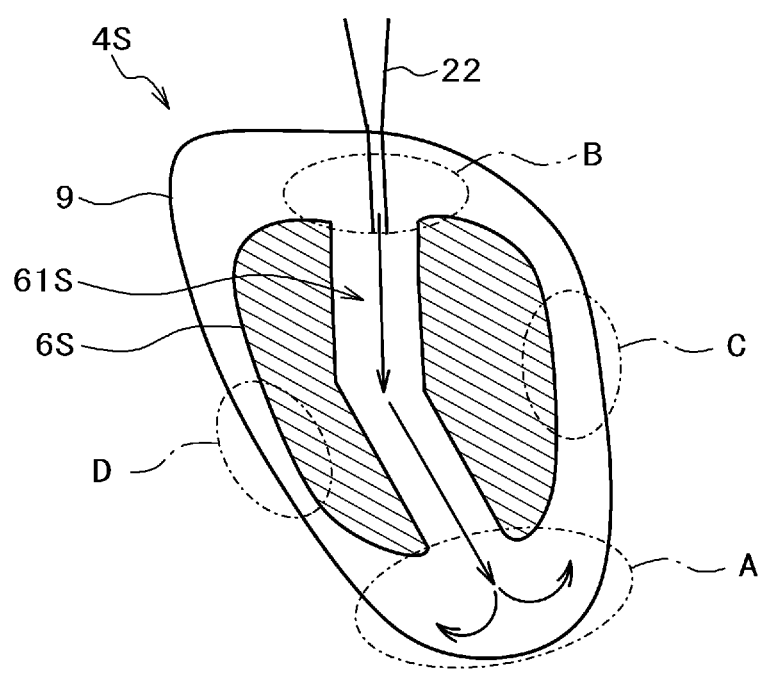
FIG. 6 is a schematic cross-sectional view that shows a headrest of the comparative example 1-2.

Next, examples where the structure of the pouring passage of the core member is different from that of the present embodiment (comparative examples 1-1, 1-2) are explained using FIGS. 5, 6. FIG. 5 is a schematic cross-sectional view that shows a headrest of the comparative example 1-1, and is a drawing that shows a state the pouring nozzle is inserted. FIG. 6 is a schematic cross-sectional view that shows a headrest of the comparative example 1-2, and is a drawing that shows a state the pouring nozzle is inserted.

As shown in FIG. 5, a core member 6R of a headrest 4R of the comparative example 1-1 includes a straight pouring passage 61R. In the core member 6R, because there is no bent part in the pouring passage 61R, all the foaming raw material is directly poured to the top part side (part A). Therefore, when the gap between the core member 6R and the cover 9R at the front part side (part C) or the rear part side (part D) between the top part side (part A) and the bottom part side (part B) is narrow, it takes time for the foaming raw material to reach the part B, the foaming raw material is not diffused to the part B sufficiently until foaming starts, and filling of the cushion member at the part B becomes insufficient.

As shown in FIG. 6, a core member 6S of a headrest 4S of the comparative example 1-2 includes a pouring passage 61S that has a larger bore compared to the embodiment. In the core member 6S, although there is a bent part in the pouring passage 61S, because the bore is large, similarly to the comparative example 1-1, all the foaming raw material is directly poured to the part A. Therefore, when the gap between the core member 6S and the cover 9 at the part C or the part D between the part A and the part B is narrow, it takes time for the foaming raw material to reach the part B, the foaming raw material is not diffused to the part B sufficiently until foaming starts, and filling of the cushion member at the part B becomes insufficient.

The present embodiment has a structure of not feeding (incapable of feeding) the entire amount of the foaming raw material by arranging a bent pouring passage having a narrow bore, and a part of the foaming raw material can be left in before the pouring point by making the foaming raw material clog and overflow in the middle of pouring.

According to the present embodiment, by setting the diameter of the pouring passage considering the narrowness of the part C or the part D for each product, pouring allocation of the foaming raw material to the part A and the part B can be controlled.

First Modification Example

Below, several representative modification examples of the first embodiment will be exemplified. In the explanation of the modification examples below, a portion having a configuration and a function similar to those of one explained in the embodiment described above is to be capable of using a reference sign similar to that of the first embodiment described above. Also, with respect to explanation of such portion, the explanation in the embodiment described above is to be capable of being appropriately incorporated within a range not technically conflicting. Further, a part of the first embodiment described above and all or some of plural modification examples are to be appropriately incorporated in a combined manner within a range not technically conflicting.

Modification Example 1-1

Figure 7:
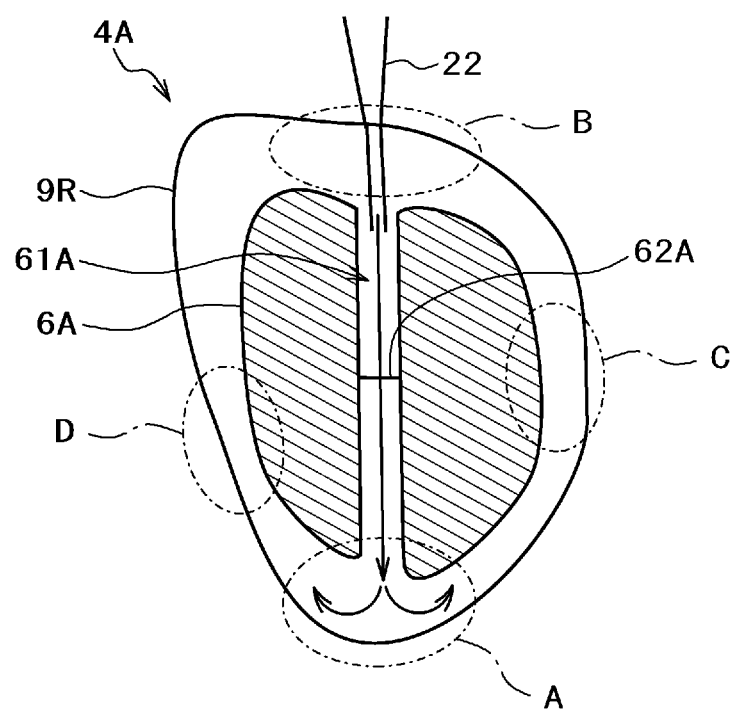
FIG. 7 is a schematic cross-sectional view that shows a headrest of the modification example 1-1.
Figure 8A:
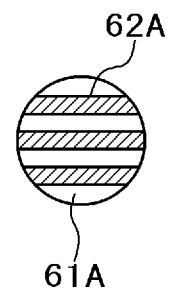
FIG. 8A is a top view of the pouring passage of FIG. 7 of a case where there are plural pieces of the stirring rods.
Figure 8B:
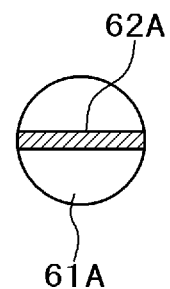
FIG. 8B is a top view of the pouring passage of FIG. 7 of a case where there is one piece of the stirring rod.

Although the bent part is included in the pouring passage in the first embodiment, the pouring passage only has to be constructed so that the foaming raw material is stirred. In the modification example 1-1, the pouring passage includes a stirring rod instead of the bent part. The headrest of the modification example 1-1 will be explained using FIGS. 7, 8A, 8B. FIG. 7 is a schematic cross-sectional view that shows a headrest of the modification example 1-1 and shows a state the pouring nozzle is inserted. FIG. 8A is a top view of the pouring passage of FIG. 7 of a case where there are plural pieces of the stirring rod. FIG. 8B is a top view of the pouring passage of FIG. 7 of a case where there is one piece of the stirring rod.

Similarly to the comparative example 1-1, a pouring passage 61A of a headrest 4A of the modification example 1-1 extends upward linearly from the lower end of a core member 6A, and reaches the upper end. At the center part (predetermined position) in the vertical direction of the pouring passage 61A, a rod 62A for stirring the foaming raw material is provided. As shown in FIG. 8A and FIG. 8B, the number of piece of the rod 62A may be one or plurality (3 pieces in FIG. 8A). The rod 62A has an action and effect similar to those of the bent part of the pouring passage of the embodiments. That is to say, stirring of the foaming raw material poured from the pouring nozzle 22 is promoted by that the foaming raw material hits the stirring rod 62A of the pouring passage 61A, and the foaming raw material blocks the pouring passage 61A. Thereby, a part of the foaming raw material passes through the pouring passage 61A, flows in directly to the part A of the headrest 4, a part of the foaming raw material can be left in the part B of the headrest 4, and therefore the forming raw material diffuses so as to flow to the gap between the outer surface of the core member 6A and the inner surface of a cover 9R from both of the part A and the part B. Thereby, because the foaming raw material reaches all gaps until foaming starts and is foamed, the core member 6A is filled with the cushion member.

Because the modification example 1-1 has a structure of not feeding (incapable of feeding) the entire amount of the foaming raw material by arranging a stirring rod in the pouring passage, similarly to the embodiments, a part of the foaming raw material can be left in before the pouring point by making the foaming raw material clog and overflow in the middle of pouring.

According to the modification example 1-1, by setting the gap according to the number of piece and the size of the stirring rod considering the narrowness of the part C or the part D for each product, pouring allocation of the foaming raw material to the part A and the part B can be controlled.

Modification Example 1-2

Figure 9:
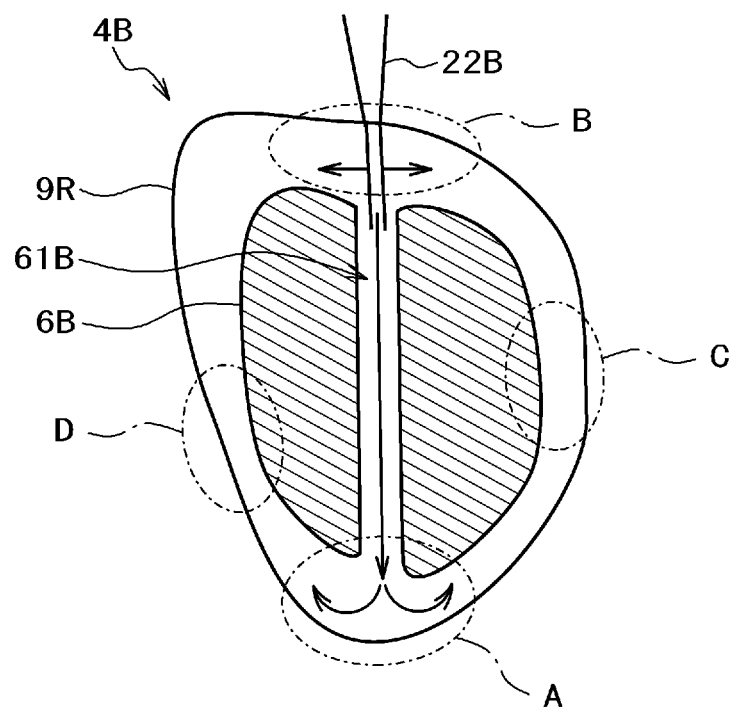
FIG. 9 is a schematic cross-sectional view that shows a headrest of the modification example 1-2.

Next, an example (modification example 1-2) where the structure of the pouring nozzle is different from that of the embodiments will be explained using FIG. 9. FIG. 9 is a schematic cross-sectional view that shows a headrest of the modification example 1-2 and shows a state the pouring nozzle is inserted.

A headrest 4B of the modification example 1-2 includes a core member 6B that includes a pouring passage 61B of a straight shape similar to that of the comparative example 1-1. On the other hand, a pouring nozzle 22B of the modification example 1-2 includes a hole that injects the foaming raw material in the extending direction of the pouring passage 61B and holes that inject the foaming raw material in the front-rear direction of the headrest at a position not inserted to the pouring passage 61B, and injects the foaming raw material in 3 directions. By using the pouring nozzle 22B, similarly to the embodiments, the part A and the part B can be filled with the foaming raw material simultaneously. However, it is required to set (manufacture) a nozzle of exclusive use according to the narrowness of the part C or the part D.

Second Embodiment (Vehicle Seat)

Figure 10:
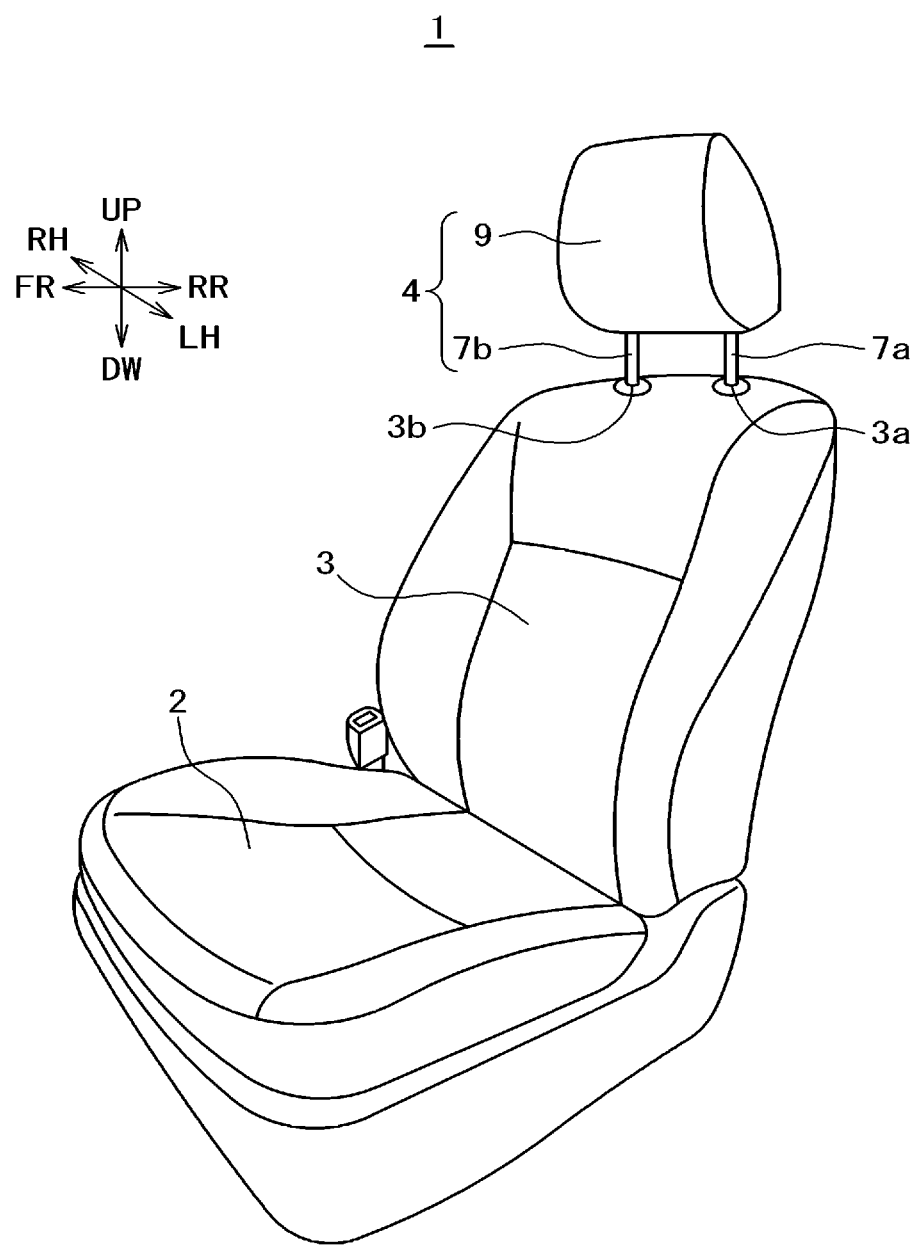
FIG. 10 is a perspective view that shows a vehicle seat related to the second embodiment.

A vehicle seat related to the second embodiment will be explained using FIG. 10. FIG. 10 is a perspective view that shows the vehicle seat related to the second embodiment. The vehicle seat 1 shown here is, for example, one of plural seats installed inside an automobile that is one kind of vehicles.

The vehicle seat 1 includes the seat cushion 2 that is a portion where an occupant sits on, the seat back 3 that is erected at the rear end of the seat cushion 2, and the headrest 4 that is attached to the upper end part of the seat back 3.

The seat cushion 2 is attached to the floor of the vehicle, and can include a mechanism that allows adjusting the position in the front-rear direction or allows adjusting the height.

The seat back 3 is a portion configuring a backrest, and is connected to the seat cushion 2 in a state turnable around a turning shaft (not illustrated) arranged at the lower end part. That is to say, the vehicle seat 1 is provided with a reclining function of tilting the seat back 3 rearward and a forward tilting function of tilting the seat back 3 forward, and the seat back 3 is configured to be turnable with respect to the seat cushion 2.

The headrest 4 is attached to the seat back 3 in a state the height position is adjustable.

The seat cushion 2, the seat back 3, and the headrest 4 are configured that a frame that becomes a framework member and a cushion member formed of a foamed resin and the like are arranged in the inside and the surface of the cushion member is covered with the cover 9.

(Headrest)

Figure 11:
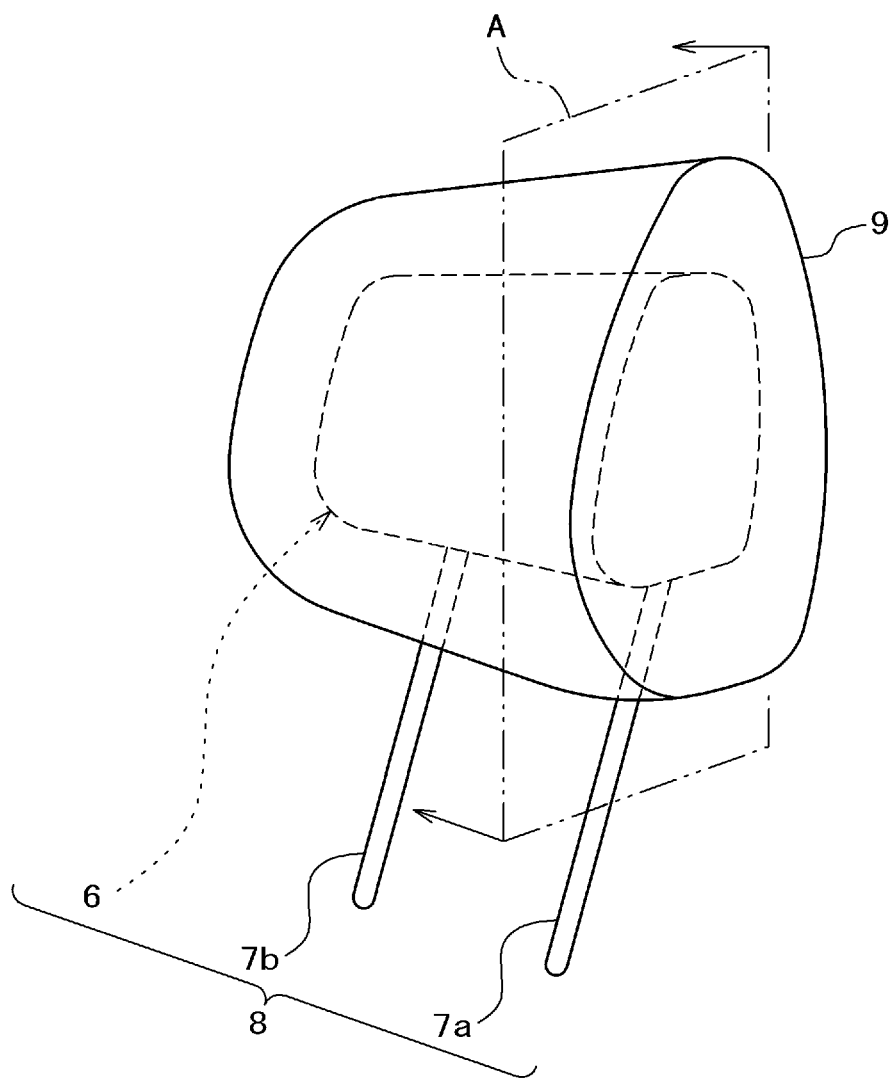
FIG. 11 is an enlarged perspective view of a headrest of FIG. 10.
Figure 12:
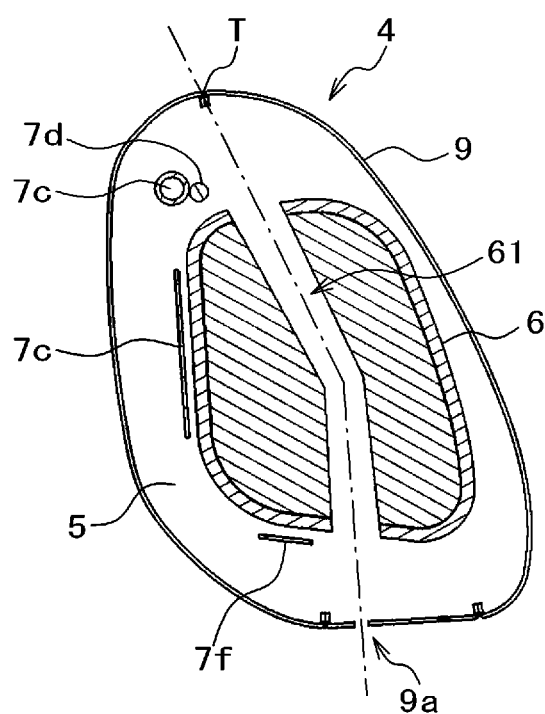
FIG. 12 is a vertical cross-sectional view along the section A in FIG. 11.

The headrest will be explained using FIGS. 11, 12. FIG. 11 is an enlarged perspective view of the headrest of FIG. 10. FIG. 12 is a vertical cross-sectional view along the section A in FIG. 11.

The headrest 4 includes the headrest frame 8, the cover 9, and the cushion member 5. The headrest frame 8 includes the core member 6, the pillar frames 7a, 7b, the frame 7c that connects the pillar frames 7a, 7b to each other, the support wire 7d that fixes the core member 6, and the brackets 7e, 7f that fix the core member 6. The core member 6 is formed by joining the front core member and the rear core member, or the right core member and the left core member, or the upper core member and the lower core member. The core member 6 is formed of a hard resin for example PP (polypropylene), or an ABS resin. Also, the core member 6 is a case body of such mechanism as described in Background for example, and corresponds to a speaker box in the example of an audio mechanism.

The pouring passage 61 is formed which is a hole penetrating in the vertical direction in the vicinity of the center in the left-right direction of the core member 6. The pouring passage 61 extends upward from the lower end of the core member 6, is bent to the front side in the vicinity of the center (predetermined position), and extends to the upper end of the core member 6. The pouring passage 61 is bent so that the top part T of the headrest 4 is positioned in the direction of heading from the vicinity of the center of the pouring passage 61 to the upper end. Here, the top part T of the headrest 4 is a region having the size of approximately two times of the bore of the pouring passage 61 around the apex of the headrest 4 in a cross-sectional view. However, when the distance of the gap between the outer surface of the core member 6 and the inner surface of the cover 9 is equal to or larger than the distance of the gap at the apex on the upper part side of the headrest 4, the top part T of the headrest 4 is a region having the size of approximately two times of the bore of the pouring passage 61 around the position in question. At an opening position of the pouring passage 61, the distance of the gap is a distance of a case of assuming that there is no opening. The cross section perpendicular to the extending direction of the pouring passage 61 has a circular shape.

The cover 9 is formed into a bag shape by sewing the surface skin members together. An opening is formed in the bottom part of the cover 9. The core member 6 is covered with the cover 9 by inserting the core member 6 of the headrest frame 8 from the opening of the bottom part of the cover 9 to the inside of the cover 9. Also, the cushion member 5 is formed between the core member 6 and the cover 9 by a method described below. As the cushion member 5, polyurethane foam for example is used. The pillar frames 7a, 7b extend to outside the cover 9. As shown in FIG. 10, by inserting the pillar frames 7a, 7b to holes (headrest guides) 3a, 3b arranged at the top part of the seat back 3, the headrest 4 is attached to the seat back 3.

Figure 13:
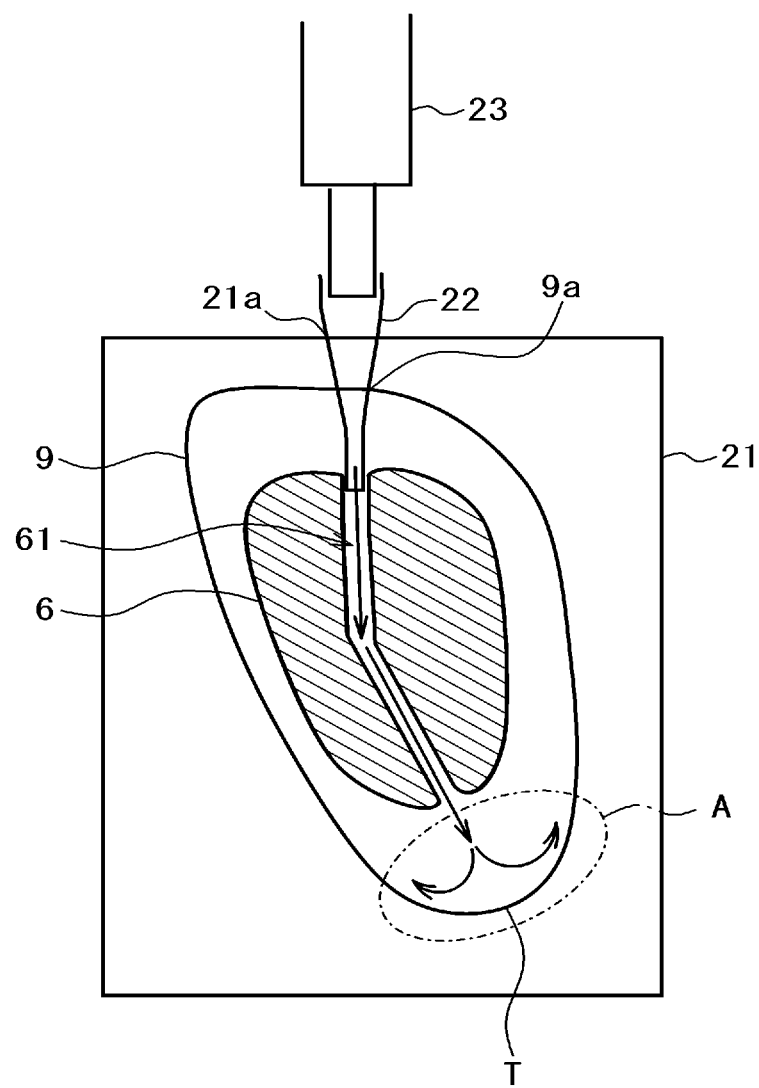
FIG. 13 is a schematic cross-sectional view that shows a state a headrest frame and a cover are arranged in a mold.

Next, a method of manufacturing the headrest 4 of the present embodiment will be explained using FIG. 13. FIG. 13 is a schematic cross-sectional view that shows a state a headrest frame and a cover are arranged in a mold.

First, the headrest frame 8 including the core member 6 is inserted to inside the cover 9 formed into a bag shape through the opening formed at the bottom part of the cover 9. Thereafter, by blocking the opening of the bottom part of the cover 9, the core member 6 is entirely covered with the cover 6 with the exception of the pouring hole 9a. In this state, the pillar frames 7a, 7b extend outside the cover 9 through 2 holes that are not illustrated. Then, the pouring nozzle 22 is inserted to the inside of the cover 9 from the pouring hole 9a so that the distal end portion of the pouring nozzle 22 enters inside the cover 9. Next, the cover 9 is set inside the mold 21, and the headrest frame 8 including the core member 6 is set to a predetermined position inside the cover 9. When the headrest frame 8 including the core member 6 is set inside the mold 21, the pillar frames 7a, 7b of the headrest frame 8 are set to a predetermined position so that the end parts that become the lower end in being attached to the seat back 3 project outward via through holes (not illustrated) formed in the mold 21. By setting the pillar frames 7a, 7b to the predetermined position, positioning of the headrest frame 8 including the core member 6 in the inside of mold is effected. Also, in a similar manner, the pouring nozzle 22 positioned between the positions where the pillar frames 7a, 7b project is also set to a predetermined position inside the mold, and positioning is effected. By the positioning of the pillar frames 7a, 7b inside the mold and positioning of the pouring nozzle 22 inside the mold, disposal of the pouring nozzle 22 with respect to the pouring passage 61 of the core member 6 is effected, and a gap at the time of the reverse flow described below is secured. Thereafter, foaming raw material (polyurethane foaming raw material for example) is poured from the pouring machine 23 into the mold through the pouring nozzle 22. At this time, the pouring machine 23 above the mold 21 is disposed so that the pouring hole 21a of the mold 21 comes to the upper part. Therefore, the top and bottom of the core member 6 and the cover 9 of FIG. 13 become opposite to FIG. 12.

In concrete terms, the pouring passage 61 is formed in the core member 6, the pouring nozzle 22 is inserted into this pouring passage 61, and the foaming raw material is poured from the pouring machine 23 with a predetermined pressure. At this time, because the extending direction of the pouring nozzle 22 and the extending direction of the lower part side of the pouring passage 61 agree to each other, the pouring passage 61 and the pouring nozzle 22 are securely attached to each other. Also, the top part T of the headrest 4 is positioned in the direction of heading from the vicinity of the center of the pouring passage 61 toward the upper end. The top part T of the headrest 4 is positioned on the front side in the front-rear direction. Thereby, all of the foaming raw material passes through the pouring passage 61, flows in directly to the top part T side (part A) of the headrest 4, and the foaming raw material diffuses so as to flow from the part A to all directions of the gap between the outer surface of the core member 6 and the inner surface of the cover 9. Thereby, because the foaming raw material reaches all gaps until foaming starts and is foamed, the core member 6 is filled with the cushion member 5.

The bore of the pouring passage 61 is the same size to the maximum outside diameter of the portion inserted to the pouring passage 61 of the pouring nozzle 22, and there is no gap between the pouring nozzle 22 and the pouring passage 61. The bore of the pouring passage 61 is 20 mm for example. In order to increase the flow speed (to fill quickly), the bore of the pouring passage 61 is preferable to be narrower than 20 mm. In order that the pouring nozzle 22 is securely attached to the pouring passage 61, it is preferable that the outside diameter of the tip part of the pouring nozzle 22 is smaller than the bore of the pouring passage 61 and the outside diameter of the root side is larger than the bore of the pouring passage 61.

Figure 14:
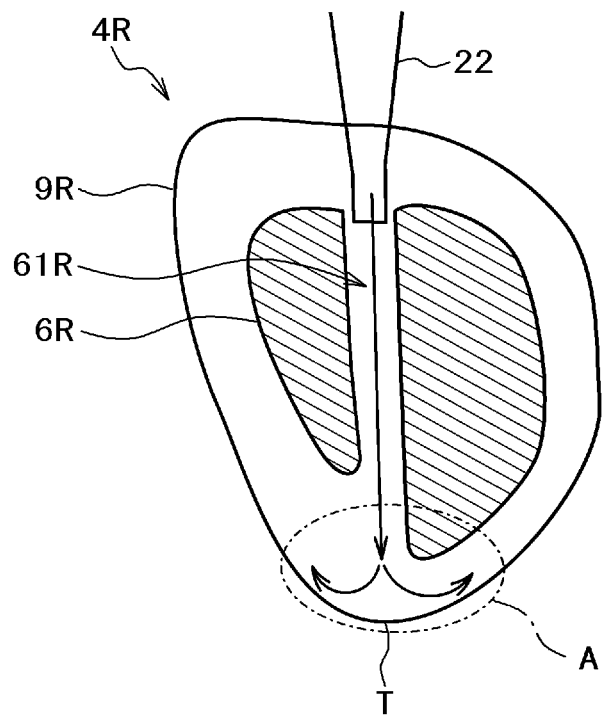
FIG. 14 is a schematic cross-sectional view that shows a headrest of the comparative example 2-1.
Figure 15:
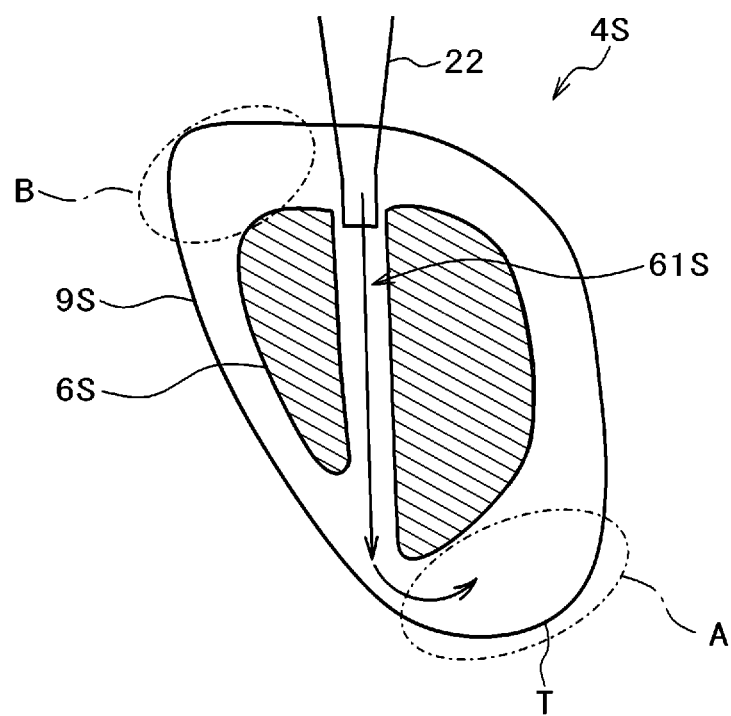
FIG. 15 is a schematic cross-sectional view that shows a headrest of the comparative example 2-2.

Next, examples (comparative examples 2-1, 2-2) in which the structure of the pouring passage of the core member and the shape of the headrest are different from those of the present embodiment are explained using FIGS. 14, 15. FIG. 14 is a schematic cross-sectional view that shows a headrest of the comparative example 2-1, and shows a state the pouring nozzle is inserted. FIG. 15 is a schematic cross-sectional view that shows a headrest of the comparative example 2-2, and shows a state the pouring nozzle is inserted.

As shown in FIG. 14, the core member 6R of the headrest 4R of the comparative example 2-1 includes the pouring passage 61R that extends in the vertical direction. The pouring nozzle 22 also extends in the vertical direction. The pouring passage 61R extends linearly from the lower end of the core member 6 toward the upper end, and the top part T of the headrest 4R is positioned in the extending direction of the pouring passage 61R. The top part T of the headrest 4R is positioned in the vicinity of the center of the front-rear direction. In the core member 6R of the headrest 4R, because there is no bent part in the pouring passage 61R, all of the foaming raw material is made to flow in directly to the top part T side (part A), and, similarly to the embodiments, the foaming raw material diffuses so as to flow from the part A to all directions of the gap between the outer surface of the core member 6 and the inner surface of the cover 9. Thereby, because the foaming raw material reaches all gaps until foaming starts and is foamed, the core member 6R is filled with the cushion member 5.

As shown in FIG. 15, similarly to the comparative example 2-1, the core member 6S of a headrest 4S of the comparative example 2-2 includes the pouring passage 61S that extends in the vertical direction. The pouring nozzle 22 also extends in the vertical direction. Although the pouring passage 61S extends linearly from the lower end of the core member 6S toward the upper end, the top part T of the headrest 4S is not positioned in the extending direction of the pouring passage 61S. The top part T of the headrest 4S is positioned in the vicinity of the center of the front-rear direction. Because all of the foaming raw material is made to flow in to the top part side (part A) and diffusion to the lower part side mainly goes through the front side, it takes time for the foaming raw material to reach the part B, the foaming raw material is not diffused sufficiently to the part B until foaming starts, and filling by the cushion member at the part B becomes insufficient.

In the present embodiment, the pouring passage partly bent and having a narrow diameter is arranged in the core member, the pouring nozzle is made to be securely attached to this pouring passage, and the foaming raw material is poured. By bending the pouring passage, the foaming raw material can be fed to a target position. Also, by bending the pouring passage, the pouring nozzle and the pouring passage can be securely attached to each other at an appropriate angle, and therefore all of the foaming raw material can be fed to a target position without a loss (leakage). In a case of the foaming raw material whose reaction rate is quick, by making the foaming raw material reach a target position before foaming starts, a deficient such as insufficient foaming and filling can be prevented beforehand.

Second Modification Example

Below, several representative modification examples of the second embodiment will be exemplified. In the explanation of the modification examples below, a portion having a configuration and a function similar to those of one explained in the second embodiment described above is to be capable of using a reference sign similar to that of the second embodiment described above. Also, with respect to explanation of such portion, the explanation in the second embodiment described above is to be capable of being appropriately incorporated within a range not technically conflicting. Further, a part of the second embodiment described above and all or a part of plural modification examples are to be appropriately incorporated in a combined manner within a range not technically conflicting.

Modification Example 2-1

Figure 16:
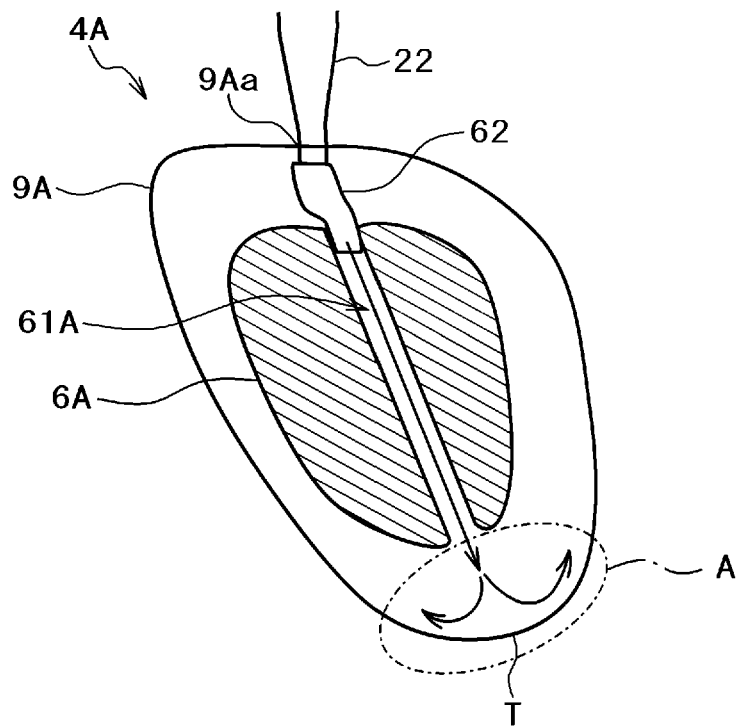
FIG. 16 is a schematic cross-sectional view that shows a headrest of the modification example 2-1.
Figure 17:
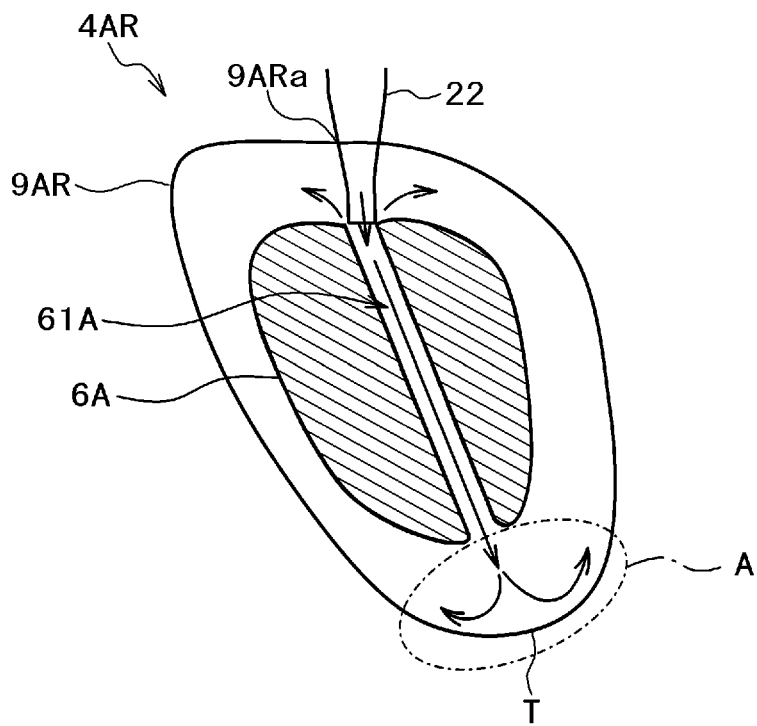
FIG. 17 is a schematic cross-sectional view that shows a headrest of the comparative example 2-3.

FIG. 16 is a drawing that shows a cross section of a headrest of the modification example 2-1, and shows a state the nozzle is inserted. FIG. 17 is a drawing that shows a cross section of a headrest of the comparative example 2-3, and shows a state the pouring nozzle is inserted.

As shown in FIG. 16, a core member 6A of a headrest 4A of the modification example 2-1 includes a pouring passage 61A that extends so as to be tilted from the vertical direction, and includes an adapter 62 between the pouring nozzle 22 and the pouring passage 61A. The pouring nozzle 22 extends in the vertical direction. The pouring passage 61A linearly extends from the lower end of the core member 6A toward the upper end, and the top part T of the headrest 4A is positioned in the extending direction of the pouring passage 61A.

As shown in FIG. 17, a headrest 4AR of the comparative example 2-3 is obtained by removing the adapter 62 from the headrest 4A of the modification example 2-1. Accompanying the removal, the position of a pouring hole 9ARa is different from that of the modification example 2-1. When the pouring passage 61A is tilted, because the extending direction of the pouring nozzle 22 and the extending direction of the pouring passage 61A do not become a same angle, the pouring nozzle 22 cannot be securely attached to the pouring passage 61A, and a part of the foaming raw material leaks out. Therefore, it is not possible to feed an appropriate amount of the foaming raw material to the part A.

However, in the modification example 2-1, the adapter 62 for absorbing difference of the extending direction of the pouring nozzle 22 and the extending direction of the pouring passage 61A is inserted from the lower end side of the pouring passage 61A and is attached. One end of the adapter 62 is securely attached to the pouring passage 61A. Also, the distal end of the pouring nozzle 22 is configured to be inserted and securely attached to the other end of the adapter 62. By forming the pouring nozzle 22 and the adapter 62 by a soft material such as silicone, dispersion of the position of the pouring nozzle 22 and the positional dimension of the core member 6A can be absorbed. Also, it is not required to make the pouring nozzle 22 bold in order to facilitate insertion to the pouring passage 61A, the pouring passage 61A can be made narrow, therefore the flow speed of the foaming raw material can be increased, and the foaming raw material can be fed to a target position more quickly.

Further, in the modification example 2-1, the position of the pouring nozzle 22 (a hole 9Aa of the cover 9) and the position of the opening of the pouring passage 61A are shifted from each other (in other words, the opening of the pouring passage 61A is not positioned in the extending direction of the pouring nozzle 22), but may agree to each other.

Modification Example 2-2

Figure 18:
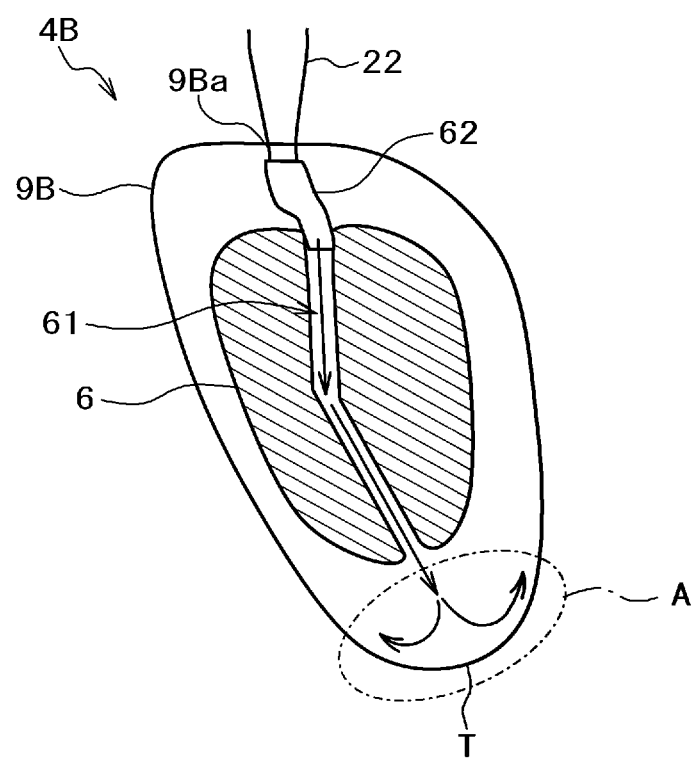
FIG. 18 is a schematic cross-sectional view that shows a headrest of the modification example 2-2.

FIG. 18 is a drawing that shows a cross section of a headrest of the modification example 2-2, and shows a state the pouring nozzle is inserted.

A headrest 4B of the modification example 2-2 is obtained by adding the adapter 62 to the headrest 4 of the embodiments. Accompanying the addition, the position of a pouring hole 9Ba of a cover 9B is different from that of the embodiments. Therefore, the core member and the pouring passage are similar to those of the embodiments. Similarly to the modification example 2-1, in the modification example 2-2, dispersion of the position of the pouring nozzle 22 and the positional dimension of the core member 6 can be absorbed.

Above, although the invention achieved by the present inventors is explained concretely based on the embodiments and the modification examples, it is needless to mention that the present invention is not limited to the embodiments and the modification examples described above and various alterations are possible.

Although an example of bending the pouring passage forward is explained in the first embodiment, the present invention is not limited to it, and the pouring passage may be bent rearward.

Also, although an example of pouring the foaming raw material with the bottom part of the head rest being brought to the top (with the top part being brought to the bottom) is explained in the first embodiment, the present invention is not limited to it, and the foaming raw material may be poured with the headrest being laid laterally.

Although an example that the extending direction of the pouring passage is the top part direction is explained in the second embodiment, the present invention is not limited to it, and when the diffusion speed of the foaming raw material upward (opposite to the top part side) largely differs in the front-rear direction, the extending direction of the pouring passage may be made to a position where diffusion is effected evenly to the front and rear. The foaming raw material coming out from the pouring passage is firstly reserved at the bottom part of the headrest in the vicinity of the head part, and thereafter fills the space while being diffused upward from the front-rear and the left-right directions of the core member. At the time of the filling while being diffused, it is preferable that the upward speed becomes same in the front-rear and the left-right directions in order that the foaming raw material goes up generally evenly in the front-rear and the left-right directions.

Although an example of bending the pouring passage forward is explained in the second embodiment, the present invention is not limited to it, and the pouring passage may be bent rearward.

Also, although an example of pouring the foaming raw material with the bottom part of the head rest being brought to the top (with the top part being brought to the bottom) is explained in the second embodiment, the present invention is not limited to it, and the foaming raw material may be poured with the headrest being laid laterally.

Preferable Embodiments of the Present Invention

Below, preferable embodiments of the present invention will be added.

(Additional Statement 1)
According to an aspect of the present invention, there is provided a vehicle seat including:
a headrest;
a seat back to which the headrest is attached; and
a seat cushion that is connected to the seat back,
in which the headrest includes:
pillar frames that are attached to the seat back;
a core member that includes a pouring passage penetrating from one end to the other end;
a cover that covers the core member and a part of the pillar frames; and
a cushion member that is formed in a gap between the outer surface of the core member and the inner surface of the cover, and
the extending direction of the pouring passage that extends from the inner side of the core member to the other end is a position where a foaming raw material is diffused evenly in the front-rear direction.

(Additional Statement 2)
In the vehicle seat according to the additional statement 1, it is preferable that:
the pouring passage extends in a first direction from the one end of the core member, extends in a second direction from a predetermined position to reach the other end, and includes a bent part at the predetermined position.

(Additional Statement 3)
In the vehicle seat according to the additional statement 2, it is preferable that:
the pouring passage is positioned at the center part of the left-right direction.

(Additional Statement 4)
In the vehicle seat according to the additional statement 2, it is preferable that:
the cover includes a hole to which a pouring nozzle is inserted, and
a direction heading from the hole to an opening of the pouring passage positioned at the one end of the core member is along the first direction.

(Additional Statement 5)
It is preferable that the vehicle seat according to the additional statement 2 further includes:
an adapter that is inserted to the pouring passage, in which
the cover includes a hole to which a pouring nozzle is inserted, and
one end of the adapter is positioned inside the pouring passage and the other end of the adapter is positioned so as to overlap with the hole.

(Additional Statement 6)
In the vehicle seat according to the additional statement 5, it is preferable that:
a direction heading from the hole to an opening of the pouring passage positioned at the one end of the core member is different from the first direction.

(Additional Statement 7)
In the vehicle seat according to the additional statement 2, it is preferable that:
the cross section of the pouring passage has a circular shape.

(Additional Statement 8)
In the vehicle seat according to the additional statement 1, it is preferable that:
the pouring passage extends in a third direction from the one end of the core member to reach the other end.

(Additional Statement 9)
In the vehicle seat according to the additional statement 8, it is preferable that:
the pouring passage is positioned at the center part of the left-right direction.

(Additional Statement 10)
It is preferable that the vehicle seat according to the additional statement 8 further includes:
an adapter that is inserted to the pouring passage,
in which the cover includes a hole to which a pouring nozzle is inserted, and
one end of the adapter is positioned inside the pouring passage and the other end of the adapter is positioned so as to overlap with the hole.

(Additional Statement 11)
In the vehicle seat according to the additional statement 10, it is preferable that:
the center of the hole and the center of an opening of the pouring passage positioned at the one end of the core member are shifted from each other.

(Additional Statement 12)
In the vehicle seat according to the additional statement 8, it is preferable that:
the cross section of the pouring passage has a circular shape.

(Additional Statement 13)
In the vehicle seat according to the additional statement 1, it is preferable that:
the extending direction of the pouring passage that extends from the inner side of the core member to the other end is the top part of the headrest.

(Additional Statement 14)

According to another aspect of the present invention, there is provided a method of manufacturing a headrest including:

(a) a step of preparing pillar frames, a core member where a pouring passage is formed, and a surface skin member that is sewed into a bag shape;

(b) a step of fixing the core member to the pillar frames;

(c) a step of inserting the core member and the pillar frames into a bag of the surface skin member;

(d) a step of setting the surface skin member, the core member, and the pillar frames to a mold; and (e) a step of pouring a foaming raw material from a pouring nozzle into the surface skin member to form a cushion member, in which the step (e) includes:

(e1) a step of inserting the pouring nozzle in a first direction to one end of the pouring passage;

(e2) a step of pouring the foaming raw material from the pouring nozzle to the pouring passage; and (e3) a step of diffusing the poured foaming raw material from the other end of the pouring passage to a position where the foaming raw material is diffused evenly in the front-rear direction to form a cushion member in a gap between the outer surface of the core member and the inner surface of the surface skin member.

(Additional Statement 15)

In the method of manufacturing a headrest according to the additional statement 14, it is preferable that:

the pouring passage extends in the first direction from the one end of the core member to reach a predetermined position, and extends in a second direction from the predetermined position to reach the other end.

(Additional Statement 16)

In the method of manufacturing a headrest according to the additional statement 15, it is preferable that:

the headrest further includes an adapter that is inserted to the pouring passage, the surface skin member includes a hole to which the pouring nozzle is inserted, and one end of the adapter is positioned inside the pouring passage and the other end of the adapter is positioned so as to overlap with the hole.

(Additional Statement 17)

In the method of manufacturing a headrest according to the additional statement 14, it is preferable that:

the headrest further includes an adapter that is inserted to the pouring passage, the surface skin member includes a hole to which the pouring nozzle is inserted, one end of the adapter is positioned inside the pouring passage and the other end of the adapter is positioned so as to overlap with the hole, and the pouring passage extends in a third direction from the one end of the core member to reach the other end of the core member.

(Additional Statement 18)

In the method of manufacturing a headrest according to the additional statement 14, it is preferable that:

a position where the foaming raw material is diffused evenly in the front-rear direction is the top part of the headrest.

What is claimed is:

1. A vehicle seat, comprising:
a headrest;
a seat back to which the headrest is attached; and
a seat cushion that is connected to the seat back,
wherein the headrest includes:
pillar frames that are attached to the seat back;
a core member that includes a pouring passage penetrating from one end of the core member to anther end of the core member;
a cover that covers the core member and a part of the pillar frames; and
a cushion member that is formed in a gap between an outer surface of the core member and an inner surface of the cover and inside the pouring passage, and
the pouring passage extends in a first direction from the one end of the core member to reach a predetermined position between the one end and the other end of the core member, extends in a second direction from the predetermined position to reach the other end of the core member, and includes a bent part at the predetermined position.

2. The vehicle seat according to claim 1, wherein the pouring passage is positioned at a center part in a left-right direction.

3. The vehicle seat according to claim 2,
wherein the cover includes a pouring hole configured to insert a pouring nozzle that pours a foaming raw material for a cushion member to the pouring passage, and
an end part of the pouring passage on the one end side of the core member is positioned in the first direction from the pouring hole.

4. The vehicle seat according to claim 2,
wherein the cover includes a pouring hole configured to insert a pouring nozzle that has a predetermined outside diameter and that pours a foaming raw material or a cushion member to the pouring passage,
an end part of the pouring passage on the one end side of the core member is positioned in the first direction from the pouring hole, and
a bore of the pouring passage is larger than the predetermined outside diameter to provide a gap between the pouring passage and the pouring nozzle.

5. The vehicle seat according to claim 4, wherein the cross section of the pouring passage has a circular shape, and the bore is 20 mm or less.

6. The vehicle seat according to claim 5, wherein the second direction is directed toward a front side of the headrest compared to the first direction.

7. A vehicle seat, comprising:
a headrest;
a seat back to which the headrest is attached; and
a seat cushion that is connected to the seat back,
wherein the headrest includes:
pillar frames that are attached to the seat back;
a core member that includes a pouring passage penetrating from one end of the core member to another end of the core member;
a cover that covers the core member and a part of the pillar frames; and
a cushion member that is formed in a gap between an outer surface of the core member and an inner surface of the cover and inside the pouring passage, and the pouring passage extends in a first direction from the one end of the core member to reach the other end, and includes a rod at a predetermined position between the one end and the other end.

8. The vehicle seat according to claim 7, wherein the pouring passage is positioned at a center part in a left-right direction.

9. The vehicle seat according to claim 8,
wherein the cover includes a pouring hole configured to insert a pouring nozzle that pours a foaming raw material for a cushion member to the pouring passage, and
an end part of the pouring passage on the one end side of the core member is positioned in the first direction from the pouring hole.

10. The vehicle seat according to claim 8,
wherein the cover includes a pouring hole configured to insert a pouring nozzle that has a predetermined outside diameter and that pours a foaming raw material for a cushion member to the pouring passage,
an end part of the pouring passage on the one end side of the core member is positioned in the first direction from the pouring hole, and
the bore of the pouring passage is larger than the predetermined outside diameter.

11. The vehicle seat according to claim 10, wherein the cross section of the pouring passage has a circular shape, and the bore is 20 mm or less.

12. A method of manufacturing a headrest, comprising:
(a) a step of preparing pillar frames, a core member where a pouring passage including stirring means for stirring a foaming raw material is formed, and a surface skin member that is sewed into a bag shape;
(b) a step of fixing the core member to the pillar frames;
(c) a step of inserting the core member and the pillar frames into a bag of the surface skin member;
(d) a step of setting the surface skin member, the core member, and the pillar frames to a mold; and
(e) a step of pouring the foaming raw material from a pouring nozzle into the surface skin member to form a cushion member,
wherein the step (e) includes:
(e1) a step of inserting the pouring nozzle to one end of the pouring passage;
(e2) a step of pouring the foaming raw material from the pouring nozzle to the pouring passage;
(e3) a step of stirring the poured foaming raw material by the stirring means; and
(e4) a step of diffusing a part of the poured foaming raw material to another end of the pouring passage and diffusing a part of the poured foaming raw material to the one end of the pouring passage to form a cushion member in a gap between an outer surface of the core member and an inner surface of the surface skin member.

13. The method of manufacturing a headrest according to claim 12, wherein the stirring means includes a bent part of the pouring passage disposed at a predetermined position between the one end and the other end of the pouring passage.

14. The method of manufacturing a headrest according to claim 12, wherein the stirring means includes a rod disposed at a predetermined position between the one end and the other end of the pouring passage.

15. The method of manufacturing a headrest according to claim 13, wherein the pouring passage extends in the first direction from the one end of the pouring passage to the bent part and extends in a second direction transverse to the first direction from the bent part to the other end of the pouring passage.

* * * * *